United States Patent

[11] 3,633,351

[72] Inventor Harold G. Meitl
 Clarendon Hills, Ill.
[21] Appl. No. 12,796
[22] Filed Feb. 19, 1970
[45] Patented Jan. 11, 1972
[73] Assignee International Harvester Company
 Chicago, Ill.

[54] FRUIT HARVESTER APRON
 3 Claims, 4 Drawing Figs.
[52] U.S. Cl. ................................................. 56/329, 193/7
[51] Int. Cl. ................................................. A01g 19/06
[50] Field of Search ......................................... 56/329; 193/7; 2/DIG. 6; 24/DIG. 18

[56] References Cited
 UNITED STATES PATENTS
3,462,932   8/1969   Pool et al. ................. 56/329
1,385,111   7/1921   Byman ....................... 56/329
3,347,032  10/1967   Pool et al. ................. 56/329
1,290,008  12/1918   Zwicker, Sr. ............... 56/329

OTHER REFERENCES
American Thread Co., VELCRO Fasteners, Jan. 16, 1961, Leaflet V

*Primary Examiner*—Russell R. Kinsey
*Assistant Examiner*—J. A. Oliff
*Attorney*—Floyd B. Harman ABSTRACT: A fruit harvester including a fruit-catching apron extensible beneath a tree to be harvested and retractable for transport. The apron includes a plurality of roller-mounted webs arranged with their edges in overlapping relation to provide a continuous surface when extended for catching fruit. Fastener means are mounted along the overlapping edges of adjacent webs to hold the webs in connected relation. The fastener means are engageable and disengageable in response to extension and retraction respectively of the apron.

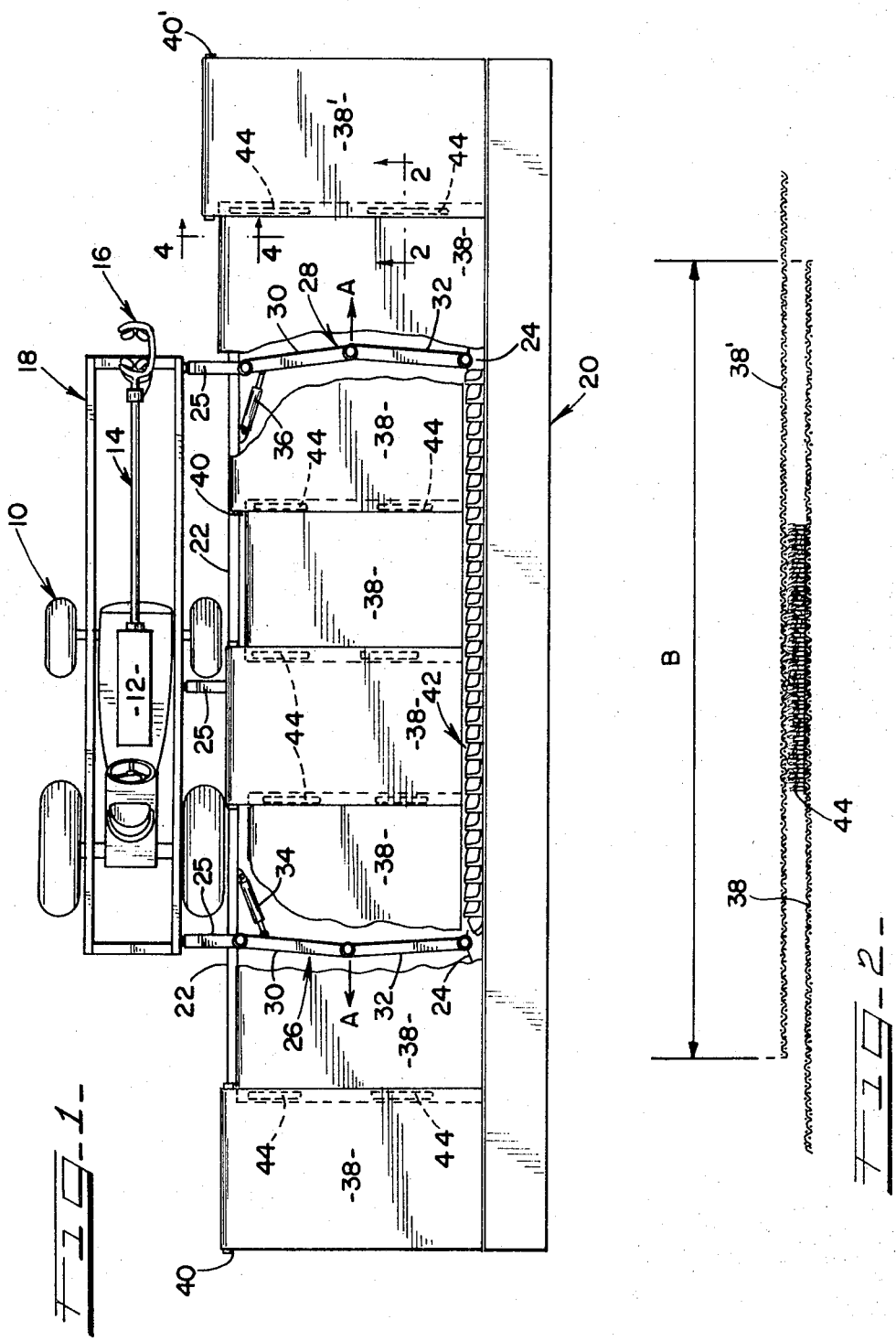

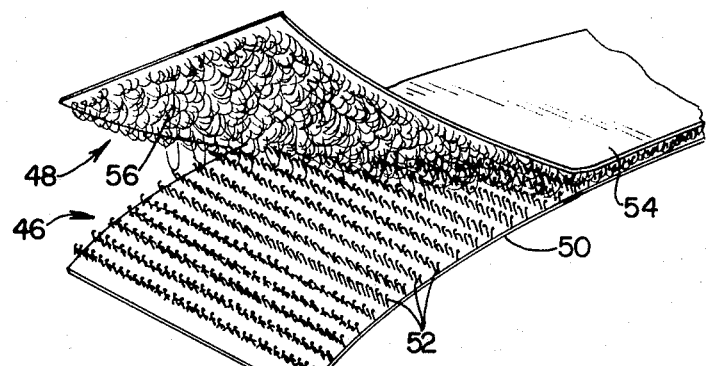
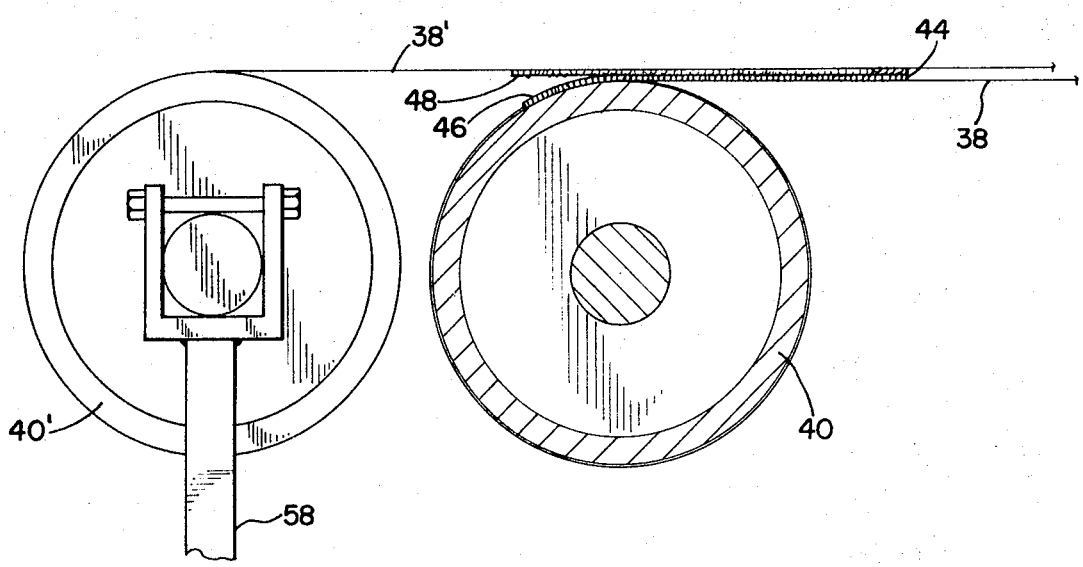

FRUIT HARVESTER APRON

BACKGROUND OF THE INVENTION

1. Field of the Invention:

The invention relates generally to fruit-harvesting machines and more particularly to an improved extensible and retractable apron for catching fruit dislodged from a tree.

2. Prior Art:

U.S. Pat. No. 3,347,032 discloses an extensible and retractable fruit-catching apron including a plurality of roller-mounted webs 94 and 95 arranged in side-by-side overlapping relation to form a continuous fruit-catching surface when extended. The surface is provided to catch fruit dislodged from a tree being harvested and to guide the same toward a conveyor system.

Several problems may be encountered in the use of a catcher mechanism of the general type shown in the above-mentioned patent. The force exerted on the webs by fruit falling thereon can be sufficient to cause adjacent webs to separate and thus form an opening in the apron surface through which the fruit can fall onto the ground. The same undesirable result can be caused by the weight of fruit accumulated on a concentrated area of the apron and also by the force of the wind lifting an edge of a web. Since an ultimate purpose of a mechanical fruit harvester is to speed the harvesting process, it is disadvantageous to require that fruit be hand collected from the ground after the operation of the machine is completed.

SUMMARY

The invention provides an improved extensible and retractable fruit-catching apron wherein the edges of adjacent roller-mounted webs are interconnected by fastener means when the apron is extended. The fastener means are arranged to automatically interconnect the edges of adjacent webs in response to extension of the apron into a fruit-catching position. Moreover, the fastener means are arranged to automatically release the interconnection between the edges of the webs in response to retraction of the fruit-catching apron.

The fastener means hold the webs in connected relation so that neither the force of fruit falling onto the apron, nor the weight of fruit collected thereon, nor the force of the wind on the apron will be effective to cause separation of the webs. The advantage is that the continuity of the fruit-catching surface is maintained so that all the fruit falling into the area covered by the apron will be collected and guided toward the associated conveyor system of the harvesting machine.

The advantage associated with the automatic engagement and release of the fastener means in response to extension and retraction of the apron, is that no manual effort is required which would slow the overall harvesting operation and increase its costs.

An object of the invention is to provide a fruit-catching apron composed of a plurality of webs and wherein the continuity of the apron is maintained during a fruit-catching operation.

Another object is to provide an extensible and retractable fruit-catching apron wherein the webs composing the apron are automatically interconnected and released in response to extension and retraction respectively of the apron.

BRIEF DESCRIPTION OF THE DRAWINGS

FIG. 1 is a plan view of a fruit-harvesting machine including an extensible and retractable fruit-catching apron;

FIG. 2 is a sectional view taken in the direction of arrows 2—2 of FIG. 1;

FIG. 3 is an enlarged perspective view of a fastener means utilized in the fruit-catching apron of FIG. 1; and FIG. 4 is a fragmentary sectional view taken in the direction of arrows 4—4 of FIG. 1 and illustrating the offset relation of adjacent rollers.

DESCRIPTION OF THE PREFERRED EMBODIMENT

Referring first to FIG. 1 there is shown a tractor 10 of the agricultural type upon which is mounted a shaker mechanism 12, an extensible boom 14, and a tree-engaging clamp 16. A framework shown generally at 18 is mounted on the tractor 10 for supporting a fruit-catching apron 20.

In essence, the apron 20 includes an inner frame member 22 and an outer frame member 24 arranged in generally parallel relation and each extending substantially the length of the apron. The frame member 22 is supported from the framework 18 by laterally extending arms shown at 25. The frame members 22 and 24 are interconnected by a pair of foldable arm assemblies 26 and 28. Each arm assembly includes an inner arm 30 pivotally connected to the inner frame member 22 and an outer arm 32 pivotally connected to the outer frame member 24. The inner and outer arms of each arm assembly are pivotally interconnected approximately midway between the inner and outer frame members as shown. Each of the pivot connections provides a substantially vertical pivot axis so that the arm assemblies 26 and 28 are foldable in a common substantially horizontal plane.

A pair of hydraulic cylinder units 34 and 36 are connected between the inner frame member 22 and the arm assemblies 26 and 28, respectively, as shown. It will be apparent that simultaneous extension of the cylinder units 34 and 36 causes the arm assemblies 26 and 28 to fold in the direction of the arrows A, thereby retracting the outer frame member 24 inwardly toward and parallel to the inner frame member 22. Retraction of the cylinder units 34 and 36 moves the arm assemblies in the opposite direction to move the outer frame member 24 outwardly from the inner frame member 22 to thus extend the apron 20.

Although unnecessary for an understanding of the present invention, the frame 18 and apron 20 may be constructed in accordance with the details shown in assignee's copending application Ser. No. 867,103 filed Oct. 16, 1969 and entitled FRUIT CATCHER AND CONVEYOR SYSTEM.

The apron 20 includes a plurality of flexible webs 38 of rubberized fabric disposed above the above-described framework for catching fruit dislodged from a tree being harvested. The outer end of each web 38 is suitably secured to the outer frame member 24. The inner end of each web 38 is secured on a respective self-winding roller 40. The rollers 40 are mounted on the inner frame member 22 in the staggered or offset positions shown so that the longitudinal edges of the webs 38 are arranged in overlapping relation. The webs 38 thus define a continuous surface for catching fruit from a tree when disposed therebeneath.

The web 38 extend outwardly and downwardly from the rollers 40 to thus provide for gravity feeding of the collected fruit toward a suitable conveyor system. A portion of such a conveyor system is shown wherein a conveyor 42 extends longitudinally of the apron 20 for conveying fruit from the apron to a suitable collection point.

In accordance with the invention, means are provided for releasably connecting the longitudinal edges of adjacent webs 38. As shown generally in FIG. 1, the edges of adjacent webs are disposed in overlapping relation across a lateral distance shown by the arrow B in FIG. 2. Disposed within the area of overlap are fasteners 44 which as shown generally in FIG. 1 may be positioned in longitudinally spaced relation.

As best shown in FIG. 3, the fasteners 44 consist of a hook tape 46 secured on a web 38 by a suitable adhesive and a pile tape 48 secured on a next adjacent web 38 in opposing relation to the hook tape 46. In the preferred embodiment of the invention the fasteners 44 are of the type marketed by the Velcro Corporation, 681 Fifth Avenue, New York, New York.

The hook tape 46 consists of a nylon strip 50 covered with a plurality of closely spaced finely woven nylon monofilaments formed into permanent hooks 52 disposed in transverse rows. The pile tape 48 consists of a nylon strip 54 covered with a plurality of soft nylon loops 56 arranged in a random manner.

It has been found that a fastener of the above type is not only effective to hole the webs 38 in interconnected relation, but moreover is operable to automatically interconnect and release the edges of adjacent webs in response to extension and retraction, respectively, of the apron 20. This feature is best exemplified in FIG. 4 wherein a pair of adjacent rollers 40 and 40' are shown with webs 38 and 38' respectively, secured thereon. A portion of a yoke structure 54 is shown by which each of the rollers 40 is supported from the inner frame member 22 of FIG. 1. As the webs 38 and 38' are unrolled from the respective rollers in response to extension of the apron 20, the tapes 46 and 48 are brought into interengagement. The hooks 52 and loops 56 (FIG. 3) become fastened together to thus hold the webs 38 and 38' in connected relation. As the apron 20 is retracted the webs are rolled upon the self-winding rollers 40 and 40'. The hooks and loops interconnecting the tapes 46 and 48 are pulled away from each other in the area above roller 40 proximate to its periphery as the web 38 is wound thereon. Accordingly, the connection between the webs is automatically released.

By the foregoing, it will be apparent that the invention provides a simple and effective means for solving the problems and fulfilling the objects as set forth above.

What is claimed is:

1. In a fruit harvester having an extensible and retractable fruit-catching apron including a plurality of rollers and a plurality of fruit-catching webs mounted respectively on the rollers in side-by-side parallel relation with the longitudinal edges of adjacent webs being disposed to provide an overlapping area, the webs being rollable upon and unrollable from the rollers in response to retraction and extension respectively of the apron, wherein the improvement comprises:

fastener means disposed along the edges of said webs within said area to hold the adjacent webs in connected relation, said fastener means including a first portion on one of said webs and a second portion on a next adjacent web, said portions being automatically interengageable and releasable in response to extension and retraction, respectively, of said apron.

2. The subject matter of claim 1, wherein said first portion includes a plurality of hook members and said second portion includes a plurality of loop members interengageable with said hook members.

3. The subject matter of claim 1, wherein adjacent pairs of said rollers are disposed in offset relation in a direction longitudinally of said webs, whereby said first and second portions of said fasteners are interengageable and releasable in an area proximate to the periphery of one of said rollers.

* * * * *